(12) United States Patent
Tung

(10) Patent No.: US 9,324,482 B1
(45) Date of Patent: Apr. 26, 2016

(54) HIGH IMPEDANCE RESISTOR DEVICE APPLIED IN HIGH VOLTAGE ENVIRONMENT

(71) Applicant: ELMATEK INTERNATION CORP., San Jose, CA (US)

(72) Inventor: Steven Tung, San Jose, CA (US)

(73) Assignee: ELMATEK INTERNATION CORP., San Jose, CA (US)

( * ) Notice: Subject to any disclaimer, the term of this patent is extended or adjusted under 35 U.S.C. 154(b) by 0 days.

(21) Appl. No.: 14/613,930

(22) Filed: Feb. 4, 2015

(51) Int. Cl.
*H01C 3/00* (2006.01)
*H01C 1/01* (2006.01)
*H01G 2/04* (2006.01)
*H01C 13/02* (2006.01)

(52) U.S. Cl.
CPC .............. *H01C 1/01* (2013.01); *H01C 13/02* (2013.01); *H01G 2/04* (2013.01)

(58) Field of Classification Search
CPC ............... H01H 33/16; H01H 33/161; Y10T 29/49082; H01C 1/028; H01C 3/14; H01C 1/14; H01R 24/48; H01R 4/027
USPC .............. 338/333, 267, 279, 282, 296, 302
See application file for complete search history.

(56) References Cited

U.S. PATENT DOCUMENTS

| | | | | | |
|---|---|---|---|---|---|
| 2,280,977 | A | * | 4/1942 | Reinhold | H05B 3/44 29/613 |
| 2,962,685 | A | * | 11/1960 | Langford | H01C 1/02 338/260 |
| 3,518,603 | A | * | 6/1970 | Keprta, Jr. | H04N 3/19 338/260 |
| 3,931,605 | A | * | 1/1976 | Bolbochan | H01C 1/06 338/261 |
| 4,230,933 | A | * | 10/1980 | Glucksman | H05B 3/16 219/517 |
| 4,363,017 | A | * | 12/1982 | Weniger | H01C 7/001 338/21 |
| 5,241,294 | A | * | 8/1993 | Pham | H01H 33/161 218/143 |
| 6,127,915 | A | * | 10/2000 | Gam | G01K 1/12 338/25 |
| 6,844,806 | B1 | * | 1/2005 | Lehmann | H01C 13/02 338/319 |
| 7,288,749 | B1 | * | 10/2007 | Kominar | H01C 3/06 219/213 |

* cited by examiner

*Primary Examiner* — Kyung Lee
(74) *Attorney, Agent, or Firm* — Chun-Ming Shih

(57) ABSTRACT

A high impedance resistor device is applied in high voltage environment. The high impedance resistor device includes a voltage-endurance column, a first end, a second end, and a plurality of high impedance resistors. The first end and second end are configured at two ends of the voltage-endurance column. The plurality of high impedance resistors are connected to each other in series from the first end to the second end, and surrounded by the voltage-endurance column. The neighbored high impedance resistors are separated by an interval so as to avoid ash and water vapor accumulated at the connecting portion, and maintains the stability high impedance. The connecting portion between the two high impedance resistors is separated by a distance with the voltage-endurance column. And the connecting portion is configured a pellet connector to avoid point discharge phenomena.

13 Claims, 14 Drawing Sheets

US 9,324,482 B1

HIGH IMPEDANCE RESISTOR DEVICE APPLIED IN HIGH VOLTAGE ENVIRONMENT

BACKGROUND OF THE INVENTION

1. Field of the Invention

The present invention is about a resistor device. More particularly, the present invention is about a high impedance resistor device applied in high voltage environment.

2. Description of the Prior Art

In order to configure the high voltage source, the prior art usually uses the high voltage-endurance and high impedance resistor device to configure signal processing. The aforementioned device sets a plurality of high voltage-endurance and high impedance resistors in series between two input ports, and outputs a reduced voltage from one of connecting points. Referring the FIGS. 1A and 1B, the resistor device of prior art configures a plurality of high impedance chip resistor 101 on the circuit board 100, and connects to each other in series between two input end (a, b). In long-term operation, the ash and water vapor will accumulated on the circuit board 100. When the chip resistor 101 applies high voltage source, the ash and water vapor distributed at the connecting point of chip resistors 101 will equivalently form a parasitic resistor 102 and affects the resistance and stability.

Referring the FIGS. 1C and 1D, when applying the time variant high voltage source (e.g. high voltage AC source) on the chip resistor 101, the ash accumulated at the connecting point of chip resistor 101 could form the equivalent parasitic resistor 102 and parasitic capacitor 103, or the combination network. Since the resistance of the connecting point is affected by the parasitic resistor 102 and parasitic capacitor 103, the voltage amplitude and phase of connecting voltage could be affected and disturb the function of devices.

Thus, providing a high impedance resistor device for dividing high voltage which can avoid the ash and water vapor interference is a technical issue that needs to be solved in the technical field.

SUMMARY OF THE INVENTION

To solve the previous technical problems, one objective of the present application is to provide a high impedance resistor device applied in high voltage environments, which can avoid the impedance variation affected by the ash and water vapor.

To achieve the aforementioned objective, the present application provides a high impedance resistor device. The device is used for dividing high working voltage and providing the divided voltage for measuring the value of the high working voltage. The aforementioned device comprises a voltage-endurance column, a first end, a second end, and a plurality of high impedance resistors. The first end is configured at one end of the voltage-endurance column, and the second end is configured at the other end of the voltage-endurance column. The plurality of high impedance resistors are connected to each other in series from the first end to the second end, and surrounded by the voltage-endurance column. Each high impedance resistor is separated by an interval with the neighbored high impedance resistors. A connecting portion between the two high impedance resistors is separated by a distance with the voltage-endurance column, and the connecting portion is configured a pellet connector to avoid point discharge phenomena.

In summary, the series connecting portion of present application is separated by a distance with the voltage-endurance column, therefore the ash and water vapor are unable to accumulate between the connecting portion and the voltage-endurance column. Hence, when the two ends of the series high impedance resistors are applied a high voltage source, the connecting portion of neighbored high impedance resistors is unable to generate a parasitic resistor by the ash or water vapor through the voltage-endurance column so as to maintain the stability of the device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Figure 1A:
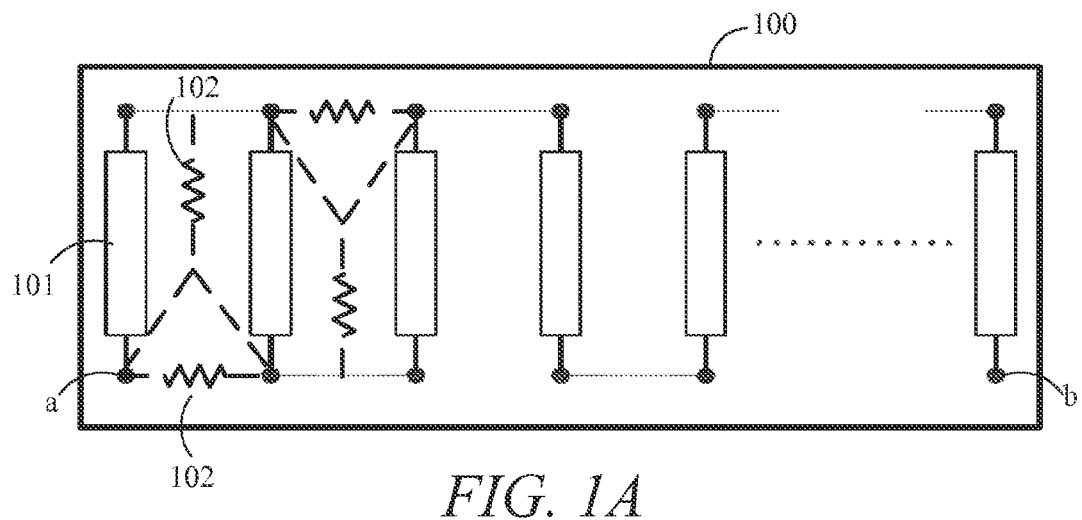
FIGS. 1A~1D shows the high impedance resistor device applied in high voltage environment of prior art.
Figure 1B:
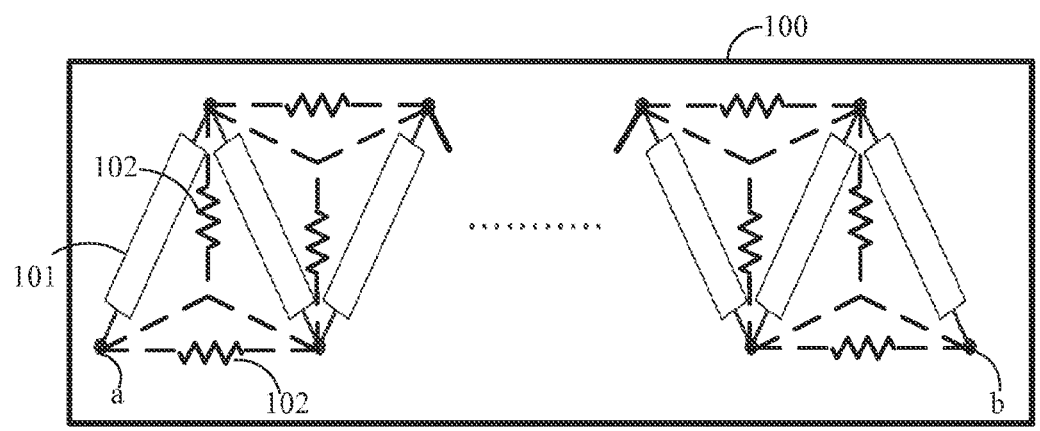
Figure 1C:
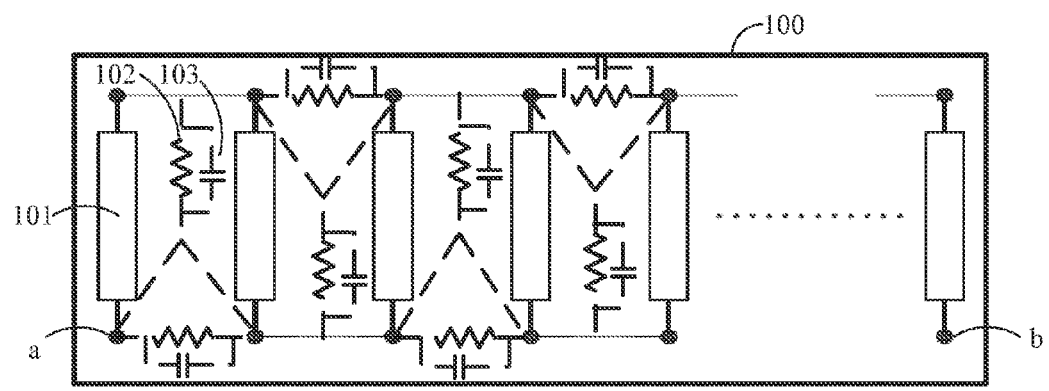
Figure 1D:
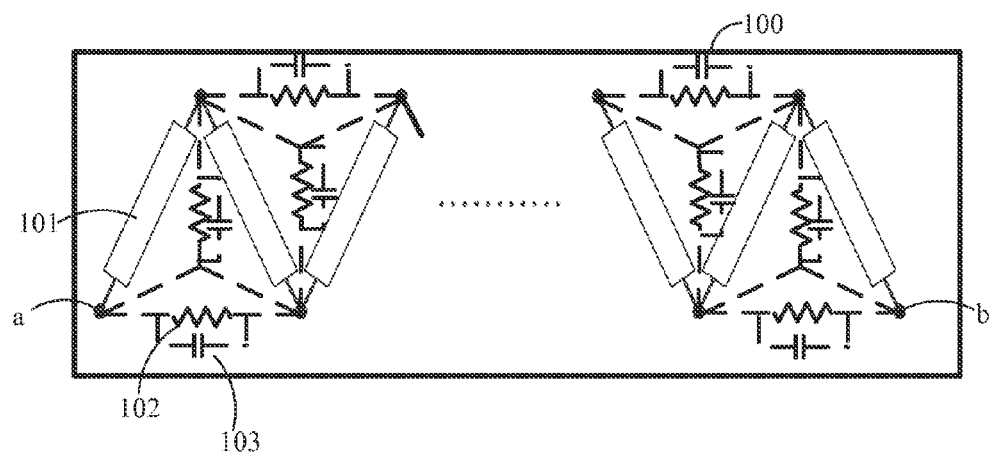
Figure 2:
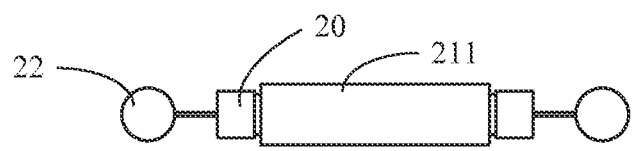
FIG. 2 shows the high impedance resistor of present application.

FIG. 2 shows a structure diagram of high impedance resistor 20 of present application. The body of the high impedance resistor 20 encases an insulation cover 211. In the prior art, the connecting portion of connected resistors tends to have a tip-shape welding point caused by the bad welding technique. To avoid point discharge phenomena by the tip-shape welding point, present application provides pellet connector 22 configured at the connected portion to cover the welding point.

Figure 3:
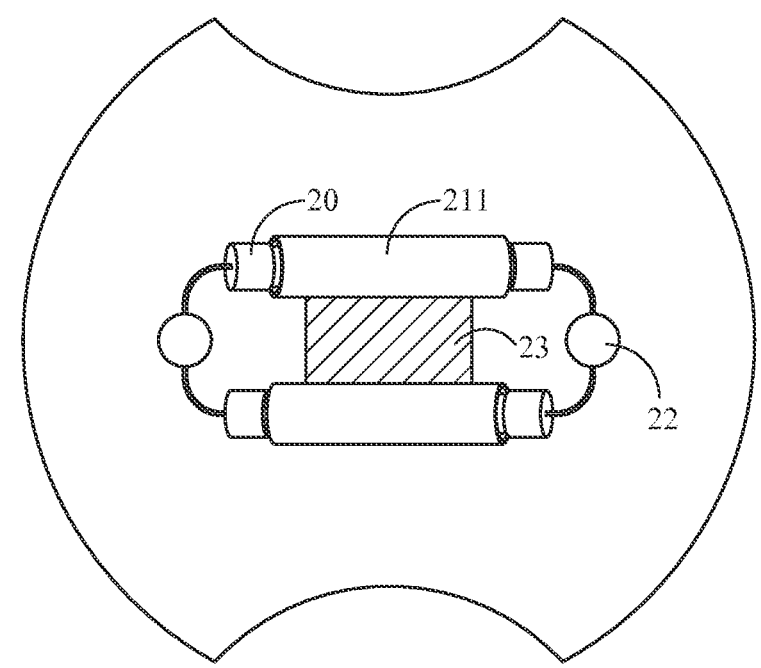
FIG. 3 shows the cross-section shape of high impedance resistor device applied in high voltage environment of first embodiment of present application.

FIG. 3 shows a cross-section of high impedance resistor device 20 applied in high voltage environment. The cross-section shape of voltage-endurance column 23 is a square shape. And the neighbored high impedance resistors 20 are configured at the two opposite surface of the voltage-endurance column 23 respectively.

Figure 4:
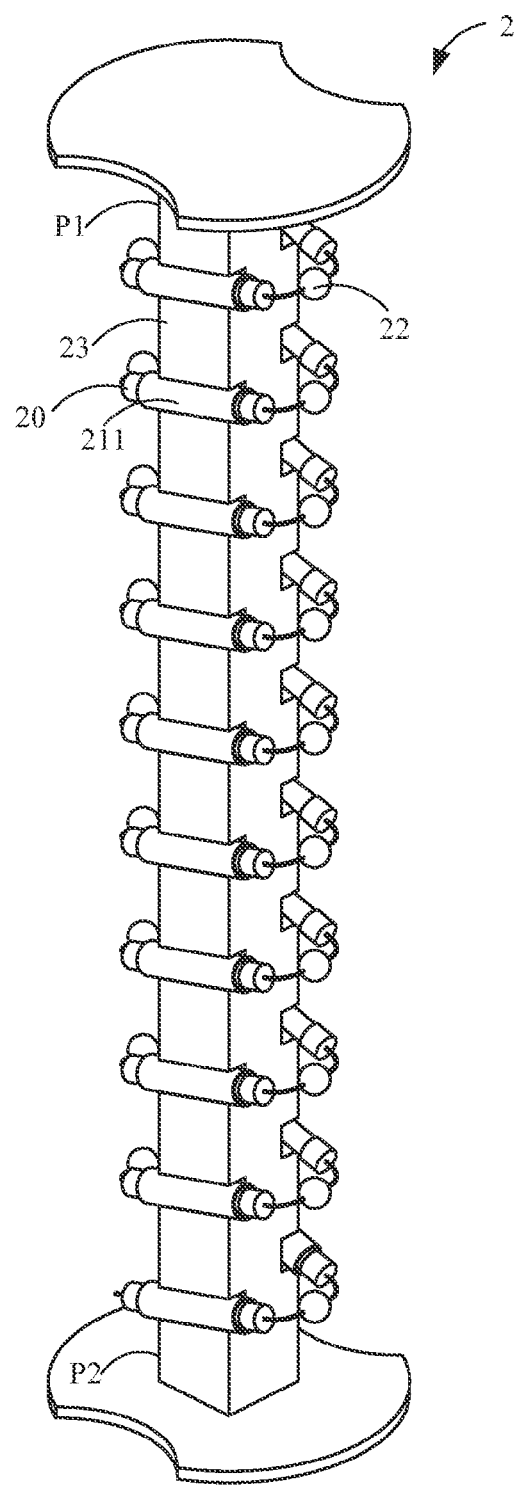
FIG. 4 shows the high impedance resistor device applied in high voltage environment of first embodiment of present application.

FIG. 4 shows the high impedance resistor device 2 applied in high voltage environment of the first embodiment of present application. The high impedance resistor device 2 comprises a voltage-endurance column 23, a first end P1, a second end P2, and a plurality of high impedance resistors 20. The high impedance resistor device 2 further configures an isolation element between the each high impedance resistor 20 and voltage-endurance column 23 to provide insulating properties. The isolation element of first embodiment is an insulation resistor cover 211. The insulation resistor cover 211 is encases at the body of high impedance resistor 20. The aforementioned first end P1 is configured at one end of the voltage-endurance column 20, and the second end P2 is configured at the other end of the voltage-endurance column 20. The plurality of high impedance resistors are connected to each other in series from the first end P1 to the second end P2, and spirally surrounded by the voltage-endurance column 20. Each high impedance resistor 20 separates by an interval with neighbored high impedance resistors in same phase of the voltage-endurance column 23, and the series connecting portion between high impedance resistors 20 separates by a distance with voltage-endurance column 23 to avoid the connecting portion through ash and the voltage-endurance column 23 to form a parasitic resistor or parasitic capacitor. The series connecting portion is configured a pellet connector 22 to cover the welding point.

When the first end P1 and second end P2 are applied a high voltage source, user can acquire a divided voltage from one of the connecting portion, and according to the divided voltage to measure value of the applied high voltage.

The aforementioned material of isolation portion (insulation resistor cover 211 or insulation pad 212) is an insulating material, such as silica gel, plastic, etc. The material of voltage-endurance column 12 is selected by high voltage-endurance material, such as Teflon, glass fiber, or ceramic. The resistance of high impedance resistor is between 1MΩ~100MΩ. The voltage-endurance value of high impedance resistor 20 is 20 KV; however the value of resistance and voltage-endurance is not intended to limit the scope of the present invention. The cross-section shape of the voltage-endurance column could coordinate with the pattern of the resistor, such as circular shape, triangle shape, square shape, or the combination thereof.

Figure 5:
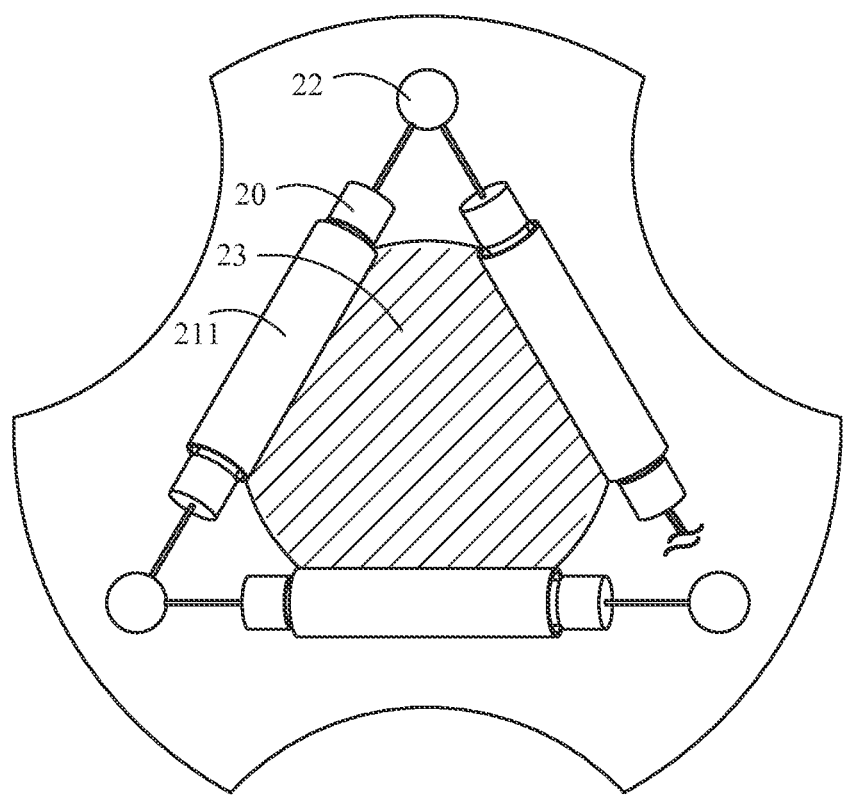
FIG. 5 shows the cross-section shape of high impedance resistor device applied in high voltage environment of second embodiment of present application.
Figure 6:
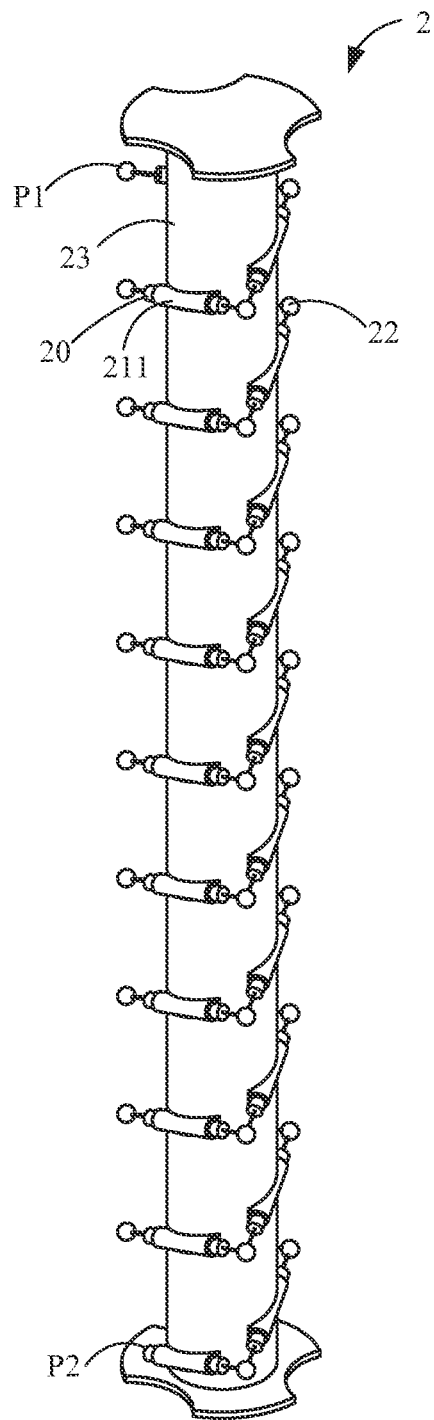
FIG. 6 shows the high impedance resistor device applied in high voltage environment of second embodiment of present application.

FIG. 5 and FIG. 6 show the second embodiment of present application. FIG. 5 shows the cross-section shape of the high impedance resistor device 2 applied in high voltage environment of second embodiment. The second embodiment is similar with the first embodiment. The main difference between the first and second embodiment is that the cross-section shape of second embodiment is circular shape. And the three series connected high impedance resistors 20 are embedded at the three cut point of the outer margin of the voltage-endurance column 23 respectively.

Figure 7:
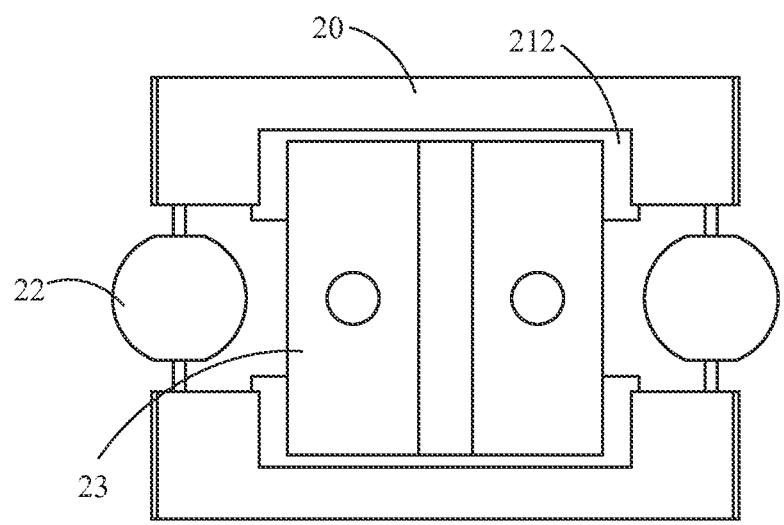
FIG. 7 shows the cross-section shape of high impedance resistor device applied in high voltage environment of third embodiment of present application.
Figure 8:
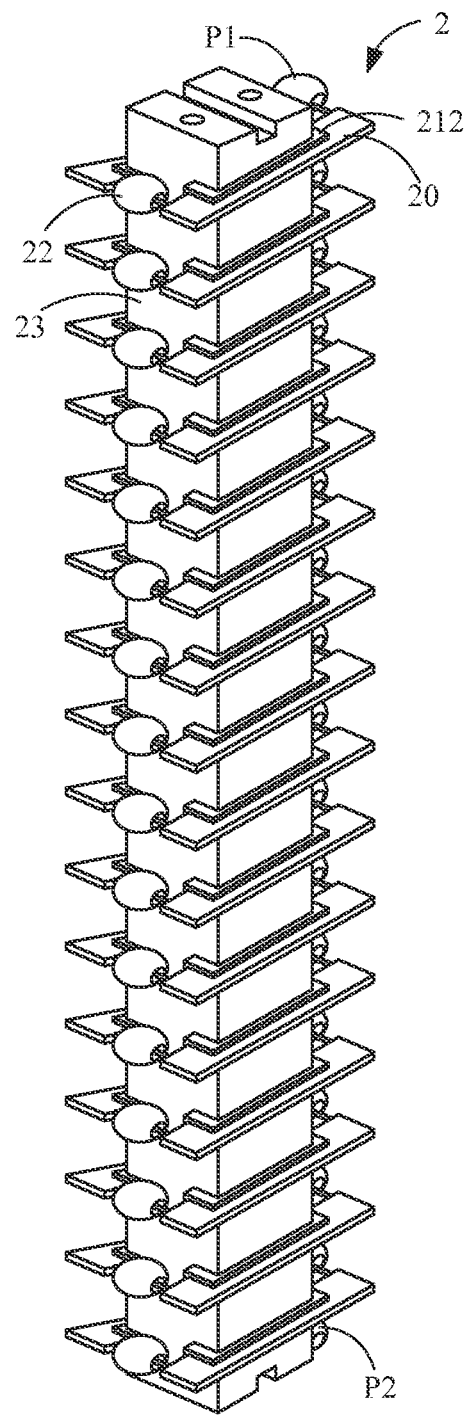
FIG. 8 shows the high impedance resistor applied in high voltage environment of third embodiment of present application.

FIG. 7 and FIG. 8 show high impedance resistor device 2 applied in high voltage environment of the third embodiment.

FIG. 7 shows the cross-section of the high voltage and high impedance resistor device 2 of second embodiment. The main difference between the first embodiment and third is that the aspect of high impedance resistor 20 of the third embodiment is chip resistor. Difference from the high impedance resistor 20 of first embodiment is embedded at the voltage-endurance column 23 through the insulation resistor cover; the chip resistor of third embodiment is configured at the voltage-endurance column 23 through the insulation pad 212.

Figure 9:
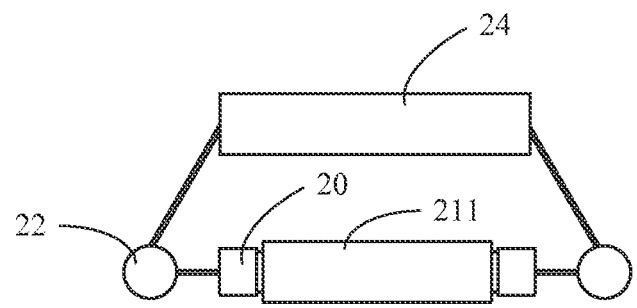
FIG. 9 shows the paralleled high impedance resistor and capacitor of present application.
Figure 10:
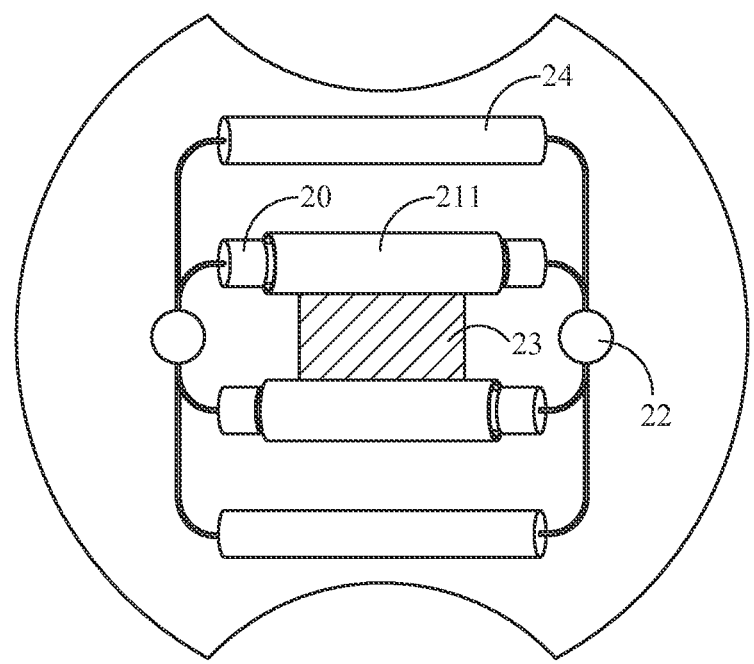
FIG. 10 shows the cross-section shape of high impedance resistor device applied in high voltage environment of forth embodiment of present application.
Figure 11:
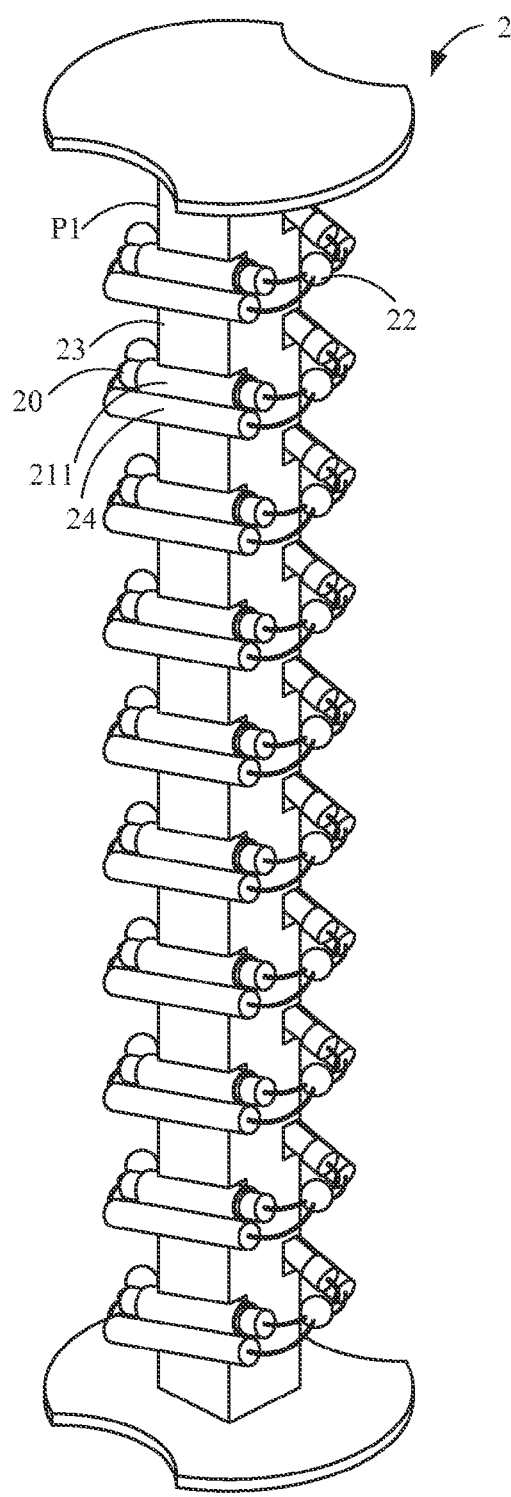
FIG. 11 shows the high impedance resistor device applied in high voltage environment of forth embodiment of present application.

FIG. 9 to FIG. 11 shows the forth embodiment of present application. The forth embodiment is similar with the first embodiment, however the difference is that the forth embodiment further comprises at least one capacitor 24. Each capacitor 24 is paralleled with the related high impedance resistor 20. The paralleled capacitor 24 and high impedance resistor 20 is applied in AC environment, and then provided the user to set the AC loading impedance by adjusting the capacitor value.

Figure 12:
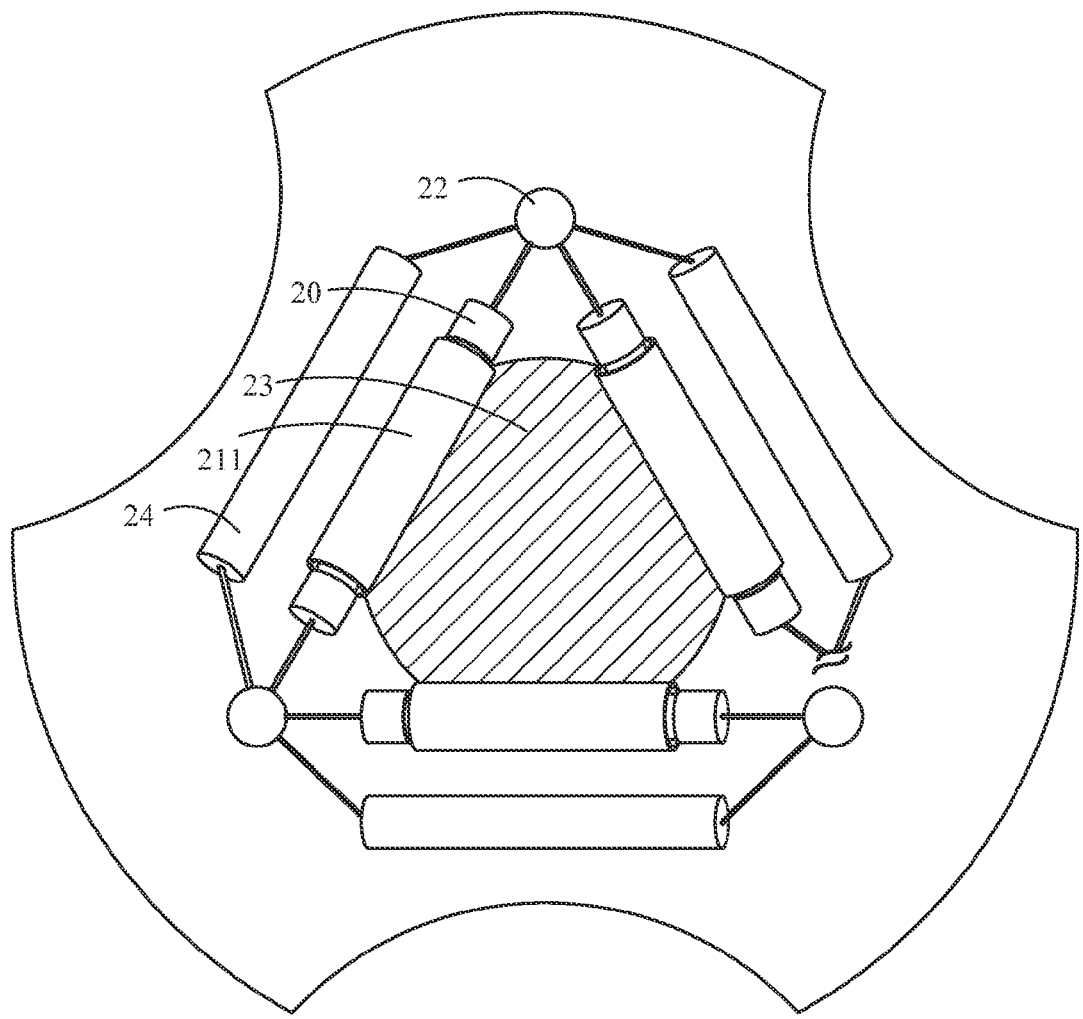
FIG. 12 shows the cross-section shape of high impedance resistor device applied in high voltage environment of fifth embodiment of present application.
Figure 13:
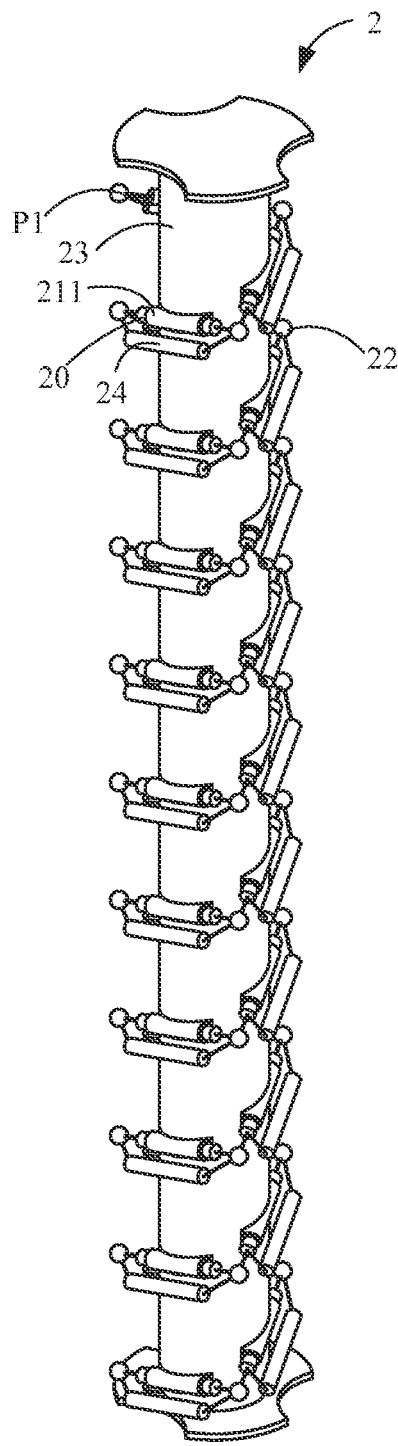
FIG. 13 shows the high impedance resistor device applied in high voltage environment of fifth embodiment of present application.

FIG. 12 and FIG. 13 shows the fifth embodiment of present application. The fifth embodiment is similar with the second embodiment; however the difference is that the fifth embodiment further comprises at least one capacitor 24. Each capacitor 24 is paralleled with the related high impedance resistor 20. The paralleled capacitor 24 and high impedance resistor 20 is applied in AC environment, and then provided the user to set the AC loading impedance by adjusting the capacitor value.

Figure 14:
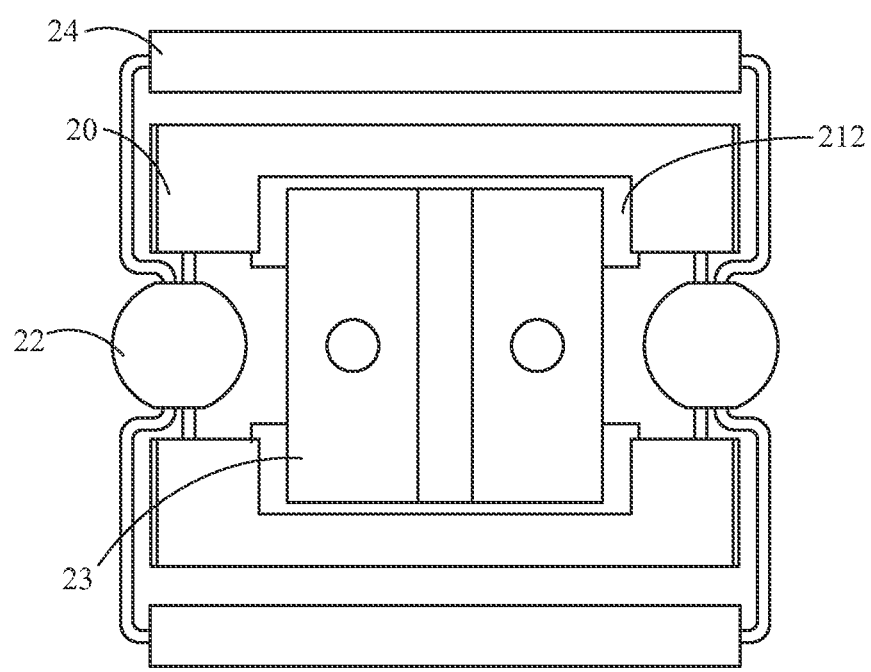
FIG. 14 shows the cross-section shape of high impedance resistor device applied in high voltage environment of sixth embodiment of present application.
Figure 15:
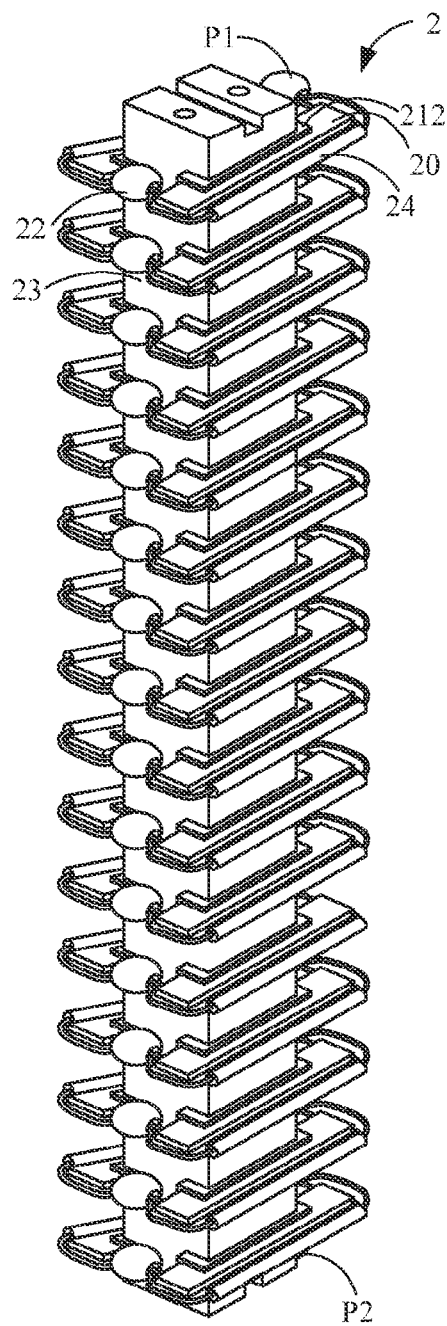
FIG. 15 shows the high impedance resistor device applied in high voltage environment of sixth embodiment of present application.

FIG. 14 and FIG. 15 shows the sixth embodiment of present application. The sixth embodiment is similar with the third embodiment; however the difference is that the sixth embodiment further comprises at least one capacitor 24. Each capacitor 24 is paralleled with the related high impedance resistor 20. The paralleled capacitor 24 and high impedance resistor 20 is applied in AC environment, and then provided the user to set the AC loading impedance by adjusting the capacitor value.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A high impedance resistor device applied in high voltage environment, comprising:
   a voltage-endurance column;
   a first end, configured at one end of the voltage-endurance column;
   a second end, configured at the other end of the voltage-endurance column; and
   a plurality of high impedance resistors, the plurality of high impedance resistors connecting to each other in series from the first end to the second end, and surrounded by the voltage-endurance column;
   wherein, neighbored high impedance resistors are separated by an interval;
   wherein, a connecting portion between the two high impedance resistors is separated by a distance with the voltage-endurance column;
   wherein, the connecting portion is configured a pellet connector.

2. The device as claimed in claim 1, wherein a section shape of the voltage-endurance column is circular form, triangle form, square form, or the combination thereof.

3. The device as claimed in claim 1, wherein material of the voltage-endurance column is glass fiber, glass, ceramic, or a high voltage-endurance material.

4. The device as claimed in claim 1, further comprising a plurality of isolation elements, wherein each isolation element is configured between the high impedance resistor and the voltage-endurance column.

5. The device as claimed in claim 4, wherein material of the isolation element is an insulation material.

6. The device as claimed in claim 4, wherein the plurality of isolation elements are a plurality of insulation resistor covers, each of the insulation resistor cover encases at the related high impedance resistor.

7. The device as claimed in claim 6, wherein material of the insulation resistor covers is silica gel material.

8. The device as claimed in claim 1, wherein the high impedance resistor is a chip resistor.

9. The device as claimed in claim 8, further comprising a plurality of isolation elements, wherein the isolation elements is a insulation pad, each insulation pads is configured between the voltage-endurance column and the related high impedance resistor.

10. The device as claimed in claim 9, wherein material of the plurality of insulation pads is silica gel material.

11. The device as claimed in claim 1, further comprising at least one capacitor, the capacitor is parallel with a related high impedance resistor.

12. The device as claimed in claim 8, further comprising at least one capacitor, each capacitor is parallel with a related high impedance resistor.

13. The device as claimed in claim 1, wherein the plurality of high impedance resistors are spiral surrounded by the voltage-endurance column.

* * * * *